(12) United States Patent
Choi et al.

(10) Patent No.: US 7,758,197 B2
(45) Date of Patent: Jul. 20, 2010

(54) BACKLIGHT ASSEMBLY AND DISPLAY DEVICE HAVING THE SAME

(75) Inventors: Seong-Sik Choi, Seoul (KR);
Kyung-Rok Ko, Suwon-si (KR);
Du-Hwan Chung, Suwon-si (KR);
Min-Ho Ok, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/536,220

(22) Filed: Sep. 28, 2006

(65) Prior Publication Data

US 2007/0081322 A1    Apr. 12, 2007

(30) Foreign Application Priority Data

Oct. 10, 2005   (KR) .................... 10-2005-0094864

(51) Int. Cl.
*G09F 13/04* (2006.01)

(52) U.S. Cl. .................... 362/97.2; 362/219; 362/632

(58) Field of Classification Search ................. 362/219, 362/223, 225, 260, 396, 97, 330, 29, 30, 362/632, 633, 634, 217; 248/68.1, 69, 74.1–74.5
See application file for complete search history.

(56) References Cited

U.S. PATENT DOCUMENTS

| 2,551,710 | A | * | 5/1951 | Slaughter | 362/355 |
| 3,606,218 | A | * | 9/1971 | Enlund et al. | 248/74.2 |
| 4,201,004 | A | * | 5/1980 | Witt | 40/545 |
| 4,523,264 | A | * | 6/1985 | West | 362/396 |
| 4,541,602 | A | * | 9/1985 | Potzas | 248/544 |
| 4,609,171 | A | * | 9/1986 | Matsui | 248/74.3 |
| 5,190,251 | A | * | 3/1993 | Bodo | 248/73 |
| 5,460,342 | A | * | 10/1995 | Dore et al. | 248/74.2 |
| 7,070,313 | B2 | * | 7/2006 | Kim et al. | 362/561 |
| 7,201,351 | B2 | * | 4/2007 | Stigler | 248/74.1 |
| 7,219,931 | B2 | * | 5/2007 | Kato | 285/61 |
| 7,510,317 | B2 | * | 3/2009 | Murakami et al. | 362/634 |
| 2006/0146512 | A1 | * | 7/2006 | Choi | 362/29 |
| 2006/0176420 | A1 | * | 8/2006 | Choi et al. | 349/62 |
| 2006/0203480 | A1 | * | 9/2006 | Choi | 362/225 |

* cited by examiner

*Primary Examiner*—Gunyoung T Lee
(74) *Attorney, Agent, or Firm*—Cantor Colburn LLP

(57) ABSTRACT

A backlight assembly includes a container, a plurality of lamps and a lamp-fixing member. The container includes a bottom face and side faces extending therefrom that define a receiving space. The lamps are arranged in parallel with each other in the container. The lamp-fixing member includes a support body installed in the container and arranged in a direction intersecting a lengthwise direction of extension of each of the lamps, a lamp-fixing portion protruding from the support body and covering a respective lamp, and a boss protruding from an inner face of the lamp-fixing portion and extending toward a center of the respective lamp to fix the respective lamp with a corresponding lamp-fixing portion via a point or line contact. Thus, a local decrease in temperature of the lamp covered by the lamp-fixing portion may be prevented to improve image display quality by preventing or eliminating dark spots.

21 Claims, 10 Drawing Sheets

BACKLIGHT ASSEMBLY AND DISPLAY DEVICE HAVING THE SAME

This application claims priority to Korean Patent Application No. 2005-94864, filed on Oct. 10, 2005, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly and a display device having the same. More particularly, the present invention relates to a backlight assembly and a display device having improved image display quality by preventing or reducing dark fields from being exhibited on an external appearance of the display device.

2. Description of the Related Art

A liquid crystal display ("LCD") device in flat display devices displays an image using electrical and optical characteristics of a liquid crystal ("LC"). The LCD device has a thin and lightweight structure, a low power consumption, a low operational voltage, etc., compared to other display devices. Therefore the LCD device has been widely used in various industries.

The LCD device includes an LCD panel for displaying an image using a light transmissivity of the LC, and a backlight assembly for supplying a light to the LCD panel.

The backlight assembly employed in the LCD device may be classified as either an edge illumination type backlight assembly or a direct illumination type backlight assembly in accordance with positions of a light source for emitting the light.

The edge illumination type backlight assembly includes a lamp for emitting light, a light-guiding plate having a side face that faces the lamp, and a container for receiving the lamp and the light-guiding plate. The light emitted from the lamp is incident to the side face of the light-guiding plate. The light-guiding plate guides a path of the light to transmit the light to the LCD panel.

The direct illumination type backlight assembly includes a plurality of lamps arranged under the LCD panel, a container for receiving the lamps, a diffusion plate placed over the lamps, and a reflection plate positioned under the lamps. Light emitted from the lamps is diffused through the diffusion plate and is then incident to the LCD panel.

The direct illumination type backlight assembly further includes a lamp support for supporting each of the lamps. The lamp support has a cylindrical shaped support surface corresponding to an external cylindrical shape of the lamps. The cylindrical shape of the lamp support includes an opening to receive the lamp and thus resembles a U-shaped hook. Thus, the U-shaped hook of the lamp support partially covers each of the lamps. Typically, a contact region between the lamp support and each of the lamps is a wide surface area.

Since the contact region entails a wide surface area, heat generated in each of the lamps is thermally conducted to the lamp support through the contact region. As the heat is thermally conducted through the contact region, a temperature of each of the lamps is locally decreased. However, the local decrease of the temperature in the lamps causes dark fields that are exhibited on an external appearance of the LCD device. The dark fields deteriorate image display quality.

BRIEF SUMMARY OF THE INVENTION

The present invention provides a backlight assembly that has improved image display quality by suppressing heat conductivity of a lamp-fixing portion.

The present invention also provides a display device having the above-mentioned backlight assembly.

A backlight assembly in accordance with an exemplary embodiment of the present invention includes a container, a plurality of lamps and a lamp-fixing member. The container includes a bottom face and side faces extending therefrom that define a receiving space. The lamps are arranged in parallel with each other in the container. The lamp-fixing member includes a support body installed in the container and arranged in a direction intersecting a lengthwise direction of extension of each of the lamps, a lamp-fixing portion protruding from the support body and covering a respective lamp, and a boss protruding from an inner face of the lamp-fixing portion and extending toward a center of the respective lamp.

According to an exemplary embodiment, the boss may make point or line contact with an outer face of the respective lamp.

According to another exemplary embodiment, the backlight assembly may further include a diffusion plate placed over the lamps to diffuse light emitted from the lamps. Further, the lamp-fixing member may include a diffusion plate support protruding upwardly from the support body to support the diffusion plate. Furthermore, the lamp-fixing member may include a protrusion formed on a bottom face of the support body and combined with the bottom face of the container.

A display device in accordance with another exemplary embodiment of the present invention includes a backlight assembly and a display device. The backlight assembly includes a container having a bottom face and side faces extending therefrom, a plurality of lamps arranged in parallel with each other on the bottom face of the container and a lamp-fixing member combined with the bottom face of the container to fix the lamps. The display panel is positioned over the backlight assembly to display an image using light emitted from the backlight assembly.

The lamp-fixing member includes a support body installed in the container and extending in a direction intersecting a lengthwise direction of extension of each of the lamps, a lamp-fixing portion protruding from the support body and covering a respective lamp, and a boss protruding from an inner face of the lamp-fixing portion and extending toward a center of the respective lamp.

According to the present invention, the boss formed on the inner face of the lamp-fixing portion functions to reduce a contact area between the lamp and the lamp-fixing member so that local decreases of temperatures on the lamps may be prevented. As a result, the display device may have uniform luminance and improved image display quality.

BRIEF DESCRIPTION OF THE DRAWINGS

The above and other aspect, features and advantages of the present invention will become more apparent by describing exemplary embodiments thereof with reference to the accompanying drawings, in which.

DETAILED DESCRIPTION OF THE INVENTION

Figure 1:
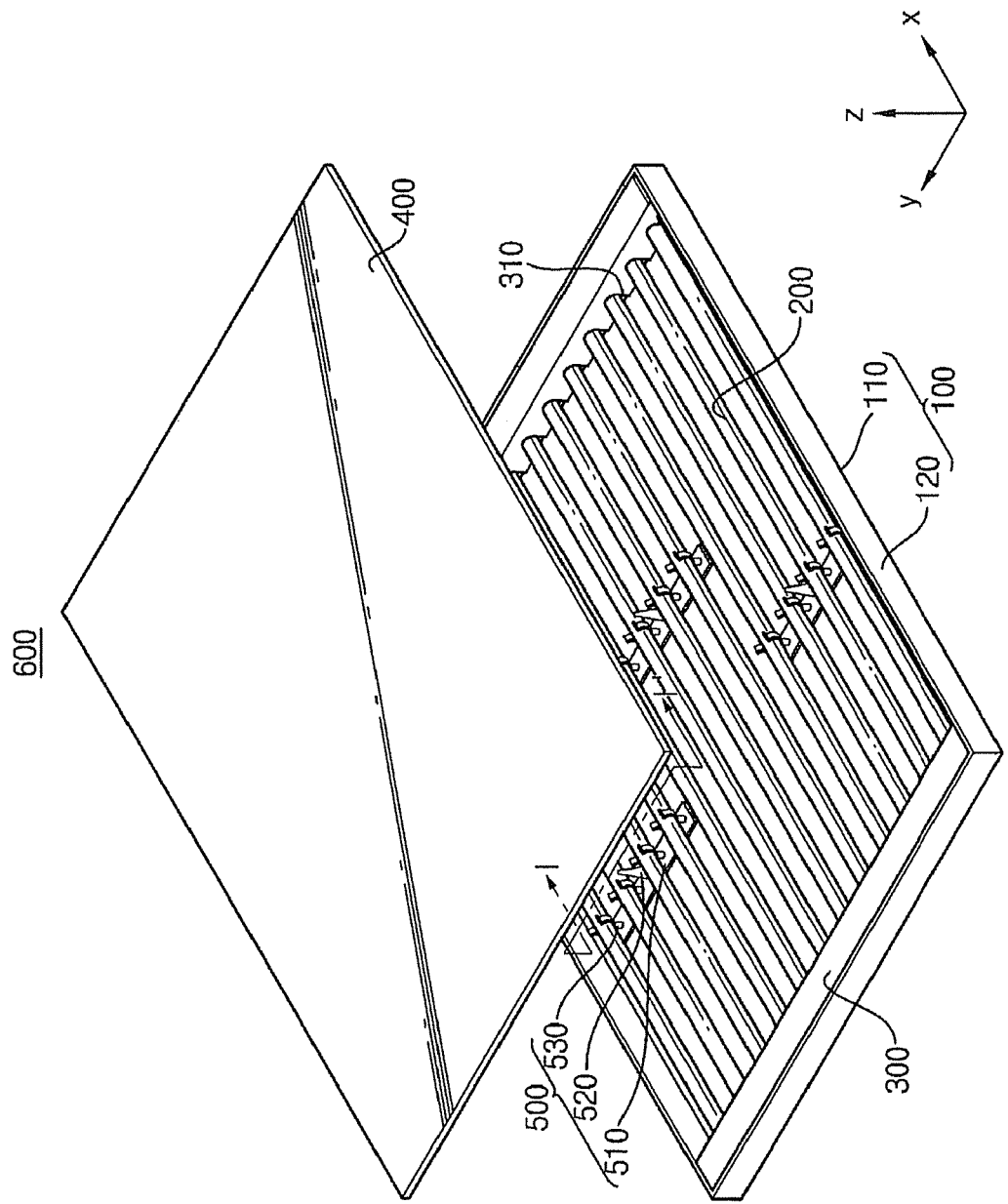
FIG. 1 is an exploded perspective view illustrating a backlight assembly in accordance with an exemplar embodiment of the present invention.

The present invention is described more fully hereinafter with reference to the accompanying drawings, in which exemplary embodiments of the present invention are shown. The present invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
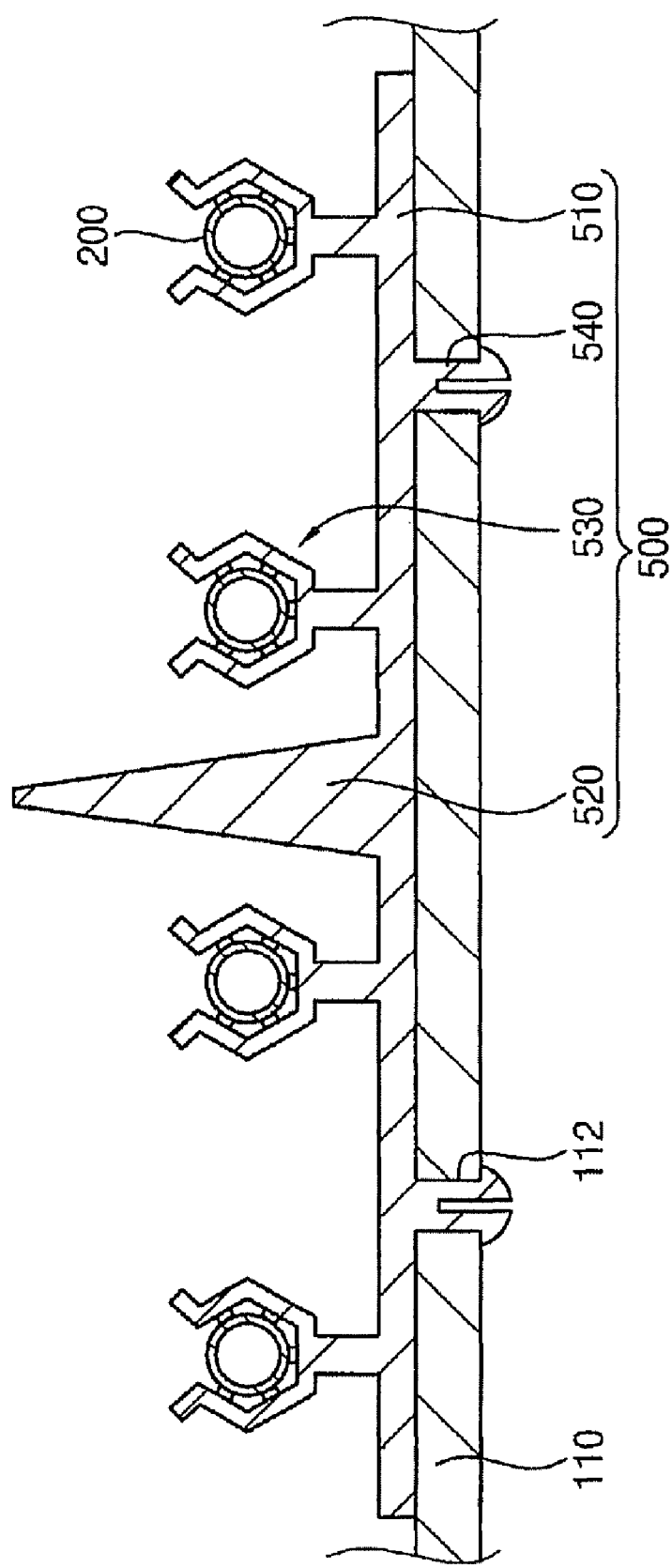
FIG. 2 is a cross-sectional view taken along line I-I' in FIG. 1.

FIG. 1 is an exploded perspective view illustrating a backlight assembly in accordance with an exemplary embodiment of the present invention. FIG. 2 is a cross-sectional view taken along line I-I' in FIG. 1.

Referring to FIGS. 1 and 2, a backlight assembly 600 of the present exemplary embodiment includes a container 100, lamps 200, a side mold 300, a diffusion plate 400 and a lamp-fixing member 500. The backlight assembly 600 emits light having uniform luminance in an upward direction.

The container 100 includes a bottom face 110 and side faces 120 extending from edges defining the bottom face 110. The bottom face 110 and the side faces 120 define a receiving space. The container 100 receives the lamps 200, the side mold 300, the diffusion plate 400 and the lamp-fixing member 500. Fixing holes 112, into which protrusions 540 of the lamp-fixing member 500 are inserted, are formed through the bottom face 110 of the container 100.

The lamps 200 emit the light. For example, the lamps 200 include a cold cathode fluorescent lamp ("CCFL") having low heat dissipation and a long life span. The lamps 200 are bar-shaped extending in an x-direction in FIG. 1. The lamps 200 are arranged in parallel to each other along a y-direction in the container 100.

Alternatively, the lamps 200 may include a U-shaped lamp, an external electrode fluorescent lamp ("EEFL"), etc., and is not limited to CCFLs.

Each of the lamps 200 is supported with a lamp support 530 of the lamp-fixing member 500 so that the lamps 200 are spaced apart from the bottom face 110 of the container 100 and from each other. Each of the lamps 200 includes a lamp body for emitting the lights and an electrode (not shown) to which power is applied.

The lamp body has a cylindrical shape. A discharge gas is injected into the lamp body. A fluorescent material (not shown) is formed on an inner face of the lamp body.

The electrode (not shown) is positioned at both ends of the lamp body. In the present exemplary embodiment, the electrode is placed in both ends of the lamp body. Alternatively, when the lamp 200 corresponds to the EEFL, the electrode may be placed on outer faces of both ends of the lamp body.

The electrode receives power generated from an inverter (not shown) through a power cable. When power is applied to the electrode, the electrode radiates electrons. The electrons then collide against the discharge gas to generate an ultraviolet ("UV") ray. The UV ray is converted into a visible ray by passing through the fluorescent material coated on the inner face of the lamp body. The visible ray is then transmitted to an exterior of the lamp body.

The side mold 300 includes a pair of molds that is arranged in the container 100 with each mold facing each other. The side mold 300 covers both ends of each of the lamps 200 to protect the corresponding electrode formed at both ends of the lamp 200. For example, the side mold 300 has an L shape or a U shape. Further, the side mold 300 has a lamp-fixing groove 310 that corresponds in shape to an external profile of each lamp body. The lamp-fixing groove 310 is combined with the lamp 200 to fix the lamp 200.

The diffusion plate 400 is positioned over the lamps 200 to diffuse the light emitted from the lamps 200. The diffusion plate 400 may have a rectangular shape, but is not limited thereto. Further, the diffusion plate 400 may include a synthetic resin for diffusing the light, such as polymetyl metacrylate (PMMA).

The diffusion plate 400 has both end portions supported by an upper end of the side mold 300, and a middle portion supported with a diffusion plate-supporting portion (e.g., see diffusion plate support 520) of the lamp-fixing member 500.

The lamp-fixing member 500 is arranged in the container 100 to support the diffusion plate 400 and the lamps 200. The lamp-fixing member 500 includes a support body 510, a diffusion plate support 520 and the lamp support 530. Additionally, the lamp-fixing member 500 may include the protrusion 540. Here, in the present exemplary embodiment, the diffusion plate support 520 and the lamp support 530 are integrally formed with the support body 510. Alternatively, the diffusion plate support 520 and the lamp support 530 may be separately formed and arranged in the container 100.

The support body 510 has a plate shape and is installed in the container 100. Further, the support body 510 may be arranged in a direction intersecting a lengthwise direction of each of the lamps 200. As illustrated in FIG. 1, the support body 510 is arranged in a direction substantially normal or transverse to the lengthwise direction of each of the lamps 200.

The diffusion plate support 520 protrudes from the support body 510 in the upward direction. For example, the diffusion plate support 520 may have a conical shape, a polygonal conical shape, etc. The diffusion plate support 520 supports a central portion of the diffusion plate 400 to prevent the central portion of the diffusion plate 400 from being deflected and maintain a substantially planar shape.

The lamp support 530 extends from the support body 510 in the upward direction to support a central portion of each of the lamps 200. Thus, the lamp support 530 functions so as to space the lamps 200 gap from the bottom face 110 of the container 100, as best seen with reference to FIG. 2.

The protrusion 540 is formed on a lower face of the lamp support 510. For example, the protrusion 540 has a hooked shape. The protrusion 540 is inserted into the fixing hole 112 formed through the bottom face 110 of the container 100. That is, the protrusion 540 is combined with the fixing hole 112 to secure the lamp-fixing member 500 to the bottom face 110 of the container 100.

To suppress light paths of the lights emitted from lamps 200 from being blocked with the lamp-fixing member 500, the lamp-fixing member 500 may be formed of a transparent material.

In addition, the backlight assembly 600 of the present exemplary embodiment may include a reflection plate (not shown) placed on the bottom face 110 of the container 100. The reflection plate reflects light, which is directed to a lower portion of the backlight assembly 600, among the light emitted from the lamps 200 toward the upward direction. Alternatively, a metal layer (not shown) for reflecting the downwardly directed light may be formed on the bottom face 110 of the container 100.

Hereinafter, the lamp support 530 will be explained with reference to FIGS. 3-10.

Figure 3:
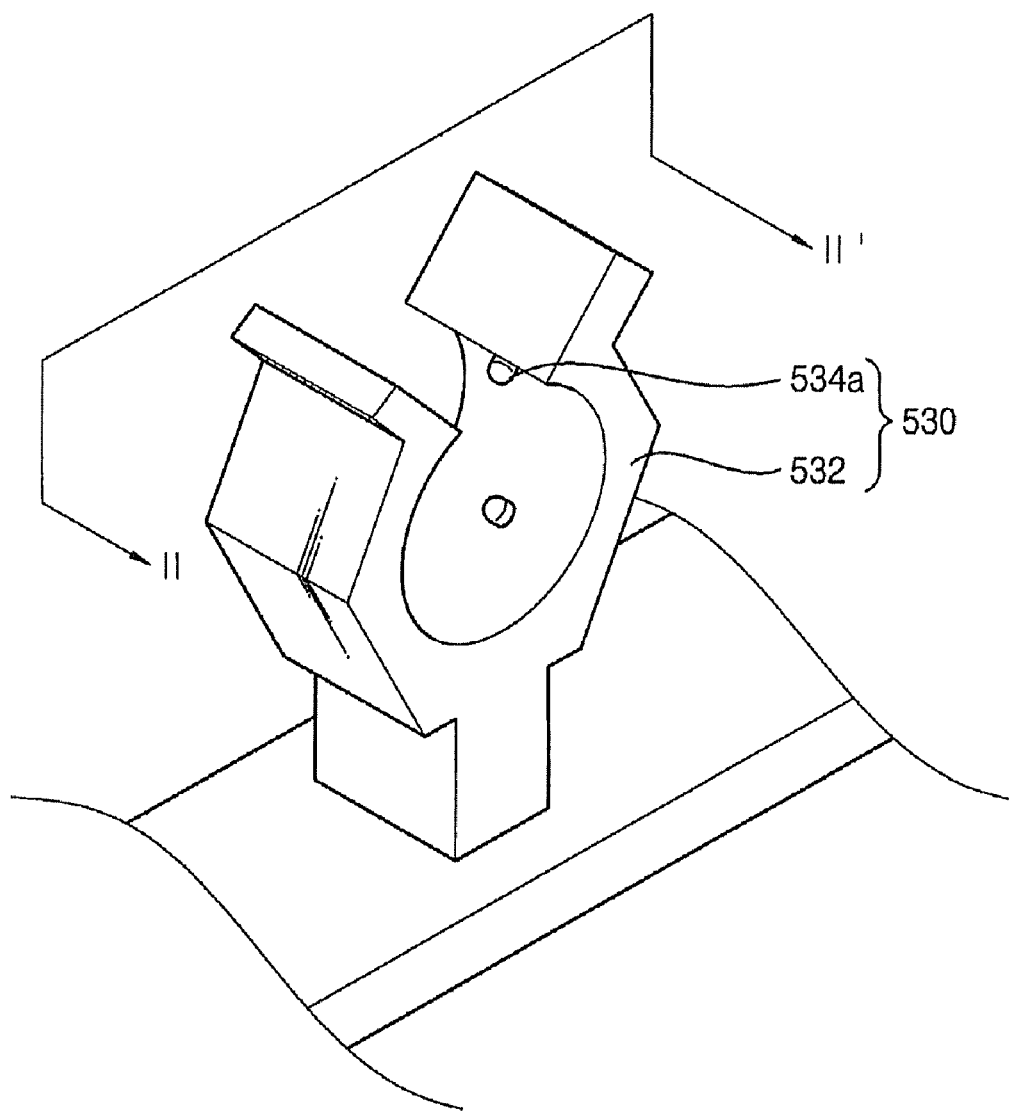
FIG. 3 is a perspective view illustrating a lamp support of the backlight assembly in FIG. 1.
Figure 4:
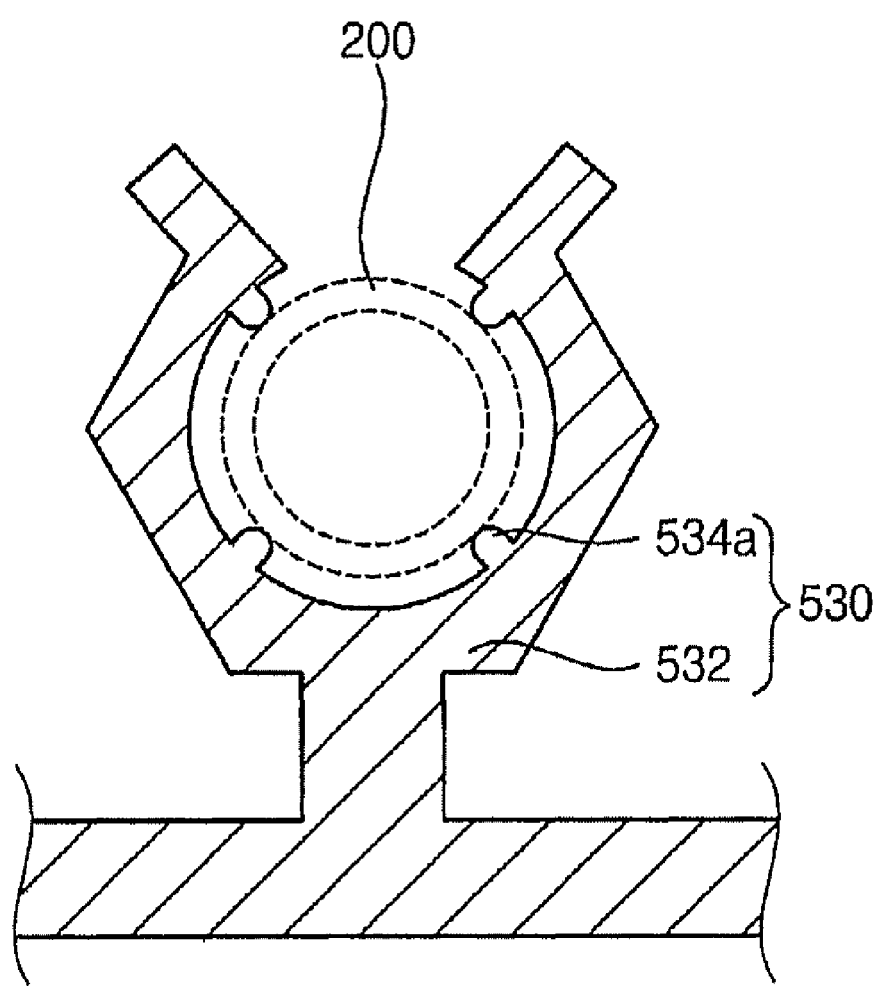
FIG. 4 is a cross-sectional view taken along line II-II' in FIG. 3.

FIG. 3 is a perspective view illustrating the lamp support 530 of the backlight assembly in FIG. 1 and FIG. 4 is a cross-sectional view taken along line II-II' in FIG. 3.

Referring to FIGS. 3 and 4, the lamp support 530 includes a lamp-fixing portion 532 and a boss 534a making contact with an outer face of a respective lamp 200 supported thereby.

The lamp-fixing portion 532 protrudes upwardly from the support body 510. Each of the lamps 200 is inserted into a respective lamp-fixing portion 532. Thus, the lamp-fixing portion 532 has an opening through which a respective lamp 200 is receivably inserted. For example, to readily combine/detach the lamps 200 with/from a respective lamp-fixing portion 532, the lamp-fixing portion 532 has a U shape having the opening differentiating the U shape from an O shape.

The boss 543a protrudes from an inner face of the lamp-fixing portion 532 extending toward a center of each of the lamps 200. The boss 543a may have a cylindrical shape that has a rounded end or is dome shaped making contact with each of the lamps 200. Alternatively, the boss 543a may have a polygonal cylindrical shape, a conical shape, a polygonal conical shape, etc. A plurality of the bosses 543a is arranged in series along the inner face of the lamp-fixing portion 532. The number of the bosses 543a may be three or four, but is not limited thereto. In this exemplary embodiment, three bosses 543a are illustrated in FIG. 4. Particularly, the bosses 543a may be arranged along a centerline of the inner face of the lamp-fixing portion 532, as illustrated in FIG. 3.

The rounded end of the boss 543a makes point contact with the outer face of each of the respective lamps 200. Thus, a contact area between the boss 543a and the lamp 200 is relatively reduced compared to a contact area between the inner face of the lamp-fixing portion 532 and the outer face of the respective lamp 200. Since the boss 543a makes point contact with the lamp 200, heat generated in the lamp 200 is not rapidly transferred to the lamp support 530, as compared to surface contact between the inner face of the lamp-fixing portion 532 without bosses 543a and the lamp.

Here, since the boss 543a makes point contact with the lamp 200, stresses may be concentratedly generated at the rounded end of the boss 543a. The stresses cause scratches or damages of the lamps 200. To suppress the generation of the stresses at the rounded end of the boss 543a, a groove (not shown) may be formed at the rounded end of the boss 543a. Here, the groove may have a curvature substantially the same as that of each of the lamps 200.

According to the present exemplary embodiment, the boss 543a makes point contact with the lamps 200 so that the heat in the lamps 200 is not rapidly transferred to the lamp support 530 through a contact portion between the boss 543a and the lamp 200. Therefore, local dark fields at the lamps 200 may be substantially reduced or effectively eliminated.

Figure 5:
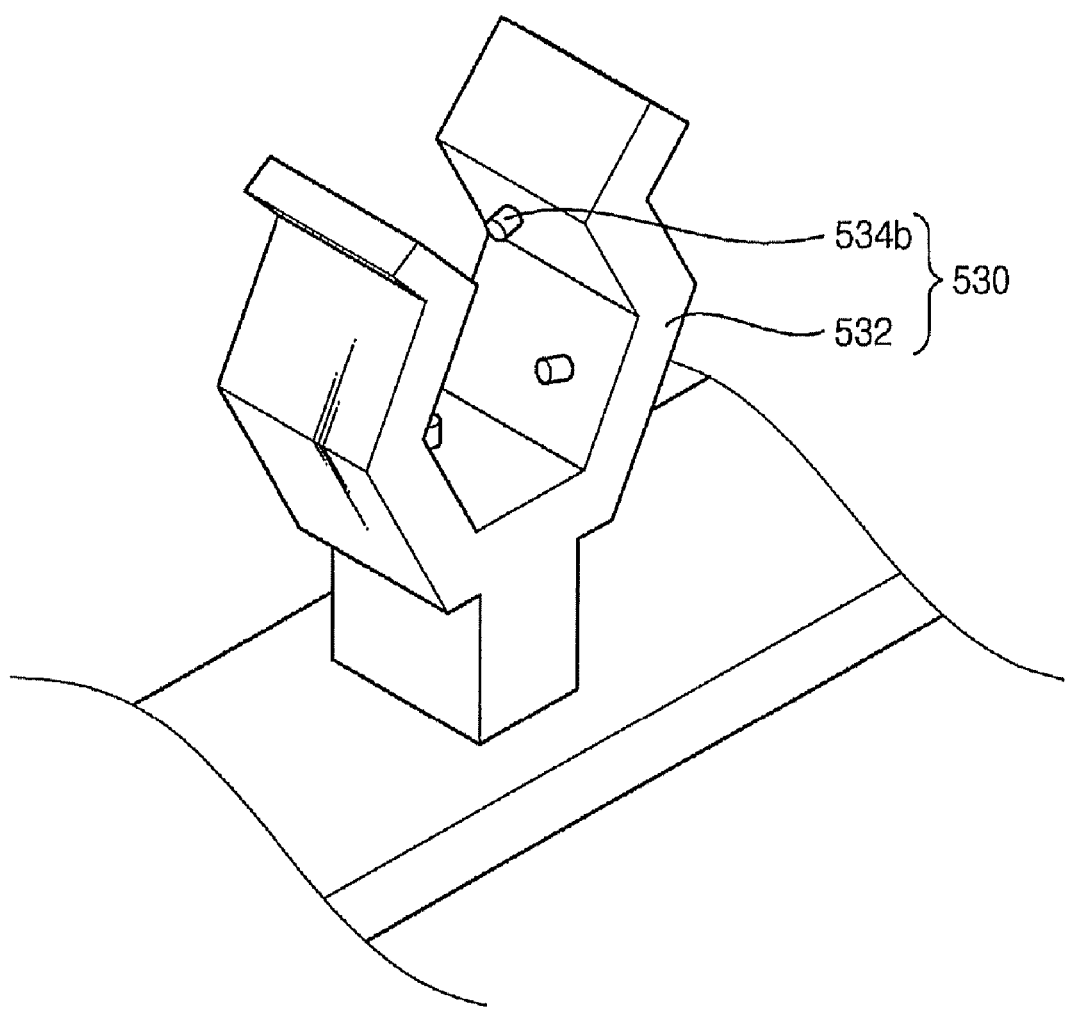
FIG. 5 is a perspective view illustrating a lamp support of a backlight assembly in accordance with another exemplary embodiment of the present invention.

FIG. 5 is a perspective view illustrating a lamp support 530 of a backlight assembly in accordance with another exemplary embodiment of the present invention.

The backlight assembly of the present exemplary embodiment includes elements substantially the same as those in the previous exemplary embodiment of FIGS. 1-4 except for a lamp support. Thus, the same reference numerals refer to the same elements and any further illustrations with respect to the same elements are omitted herein for brevity.

Referring to FIG. 5, the lamp support 530 includes a lamp-fixing portion 532 and a boss 543b for making contact with an outer face of each of the respective lamps 200.

The lamp-fixing portion 532 protrudes upwardly from the support body 510. Each of the lamps 200 is inserted into the respective lamp-fixing portion 532. Thus, the lamp-fixing portion 532 has an opening through which each of the lamps 200 is inserted.

The boss 543b protrudes from an inner face of the lamp-fixing portion 532 extending toward a center of each of the respective lamps 200. The boss 543b may have a cylindrical shape. The boss 543b has an end making point contact with is the outer face of a respective lamp 200 so that a contact area between the boss 543b and the lamp 200 is relatively reduced compared to a contact area between the inner face of the lamp-fixing portion 532 and the outer face of the respective lamp 200.

A plurality of the bosses 543b is arranged in a zigzag pattern along the inner face of the lamp-fixing portion 532 (e.g., not aligned along a centerline of the inner face). More particularly, the bosses 543b are offset from a centerline of the inner face of the lamp-fixing portion 532. That is, the bosses 543b are alternately arranged on a first inner face portion left of the centerline and a second inner face portion right of the centerline.

To suppress generation of stresses at the end of the boss 543b, a groove (not shown) may be formed at the end of the boss 543b. Here, the groove may have a curvature substantially the same as that of each of the lamps 200.

According to the present exemplary embodiment, since the bosses 543a are arranged in a zigzag pattern along the inner face of the lamp-fixing portion 532, the lamp support 530 of FIG. 5 may support the lamps more securely compared to the lamp support of FIG. 3.

Figure 6:
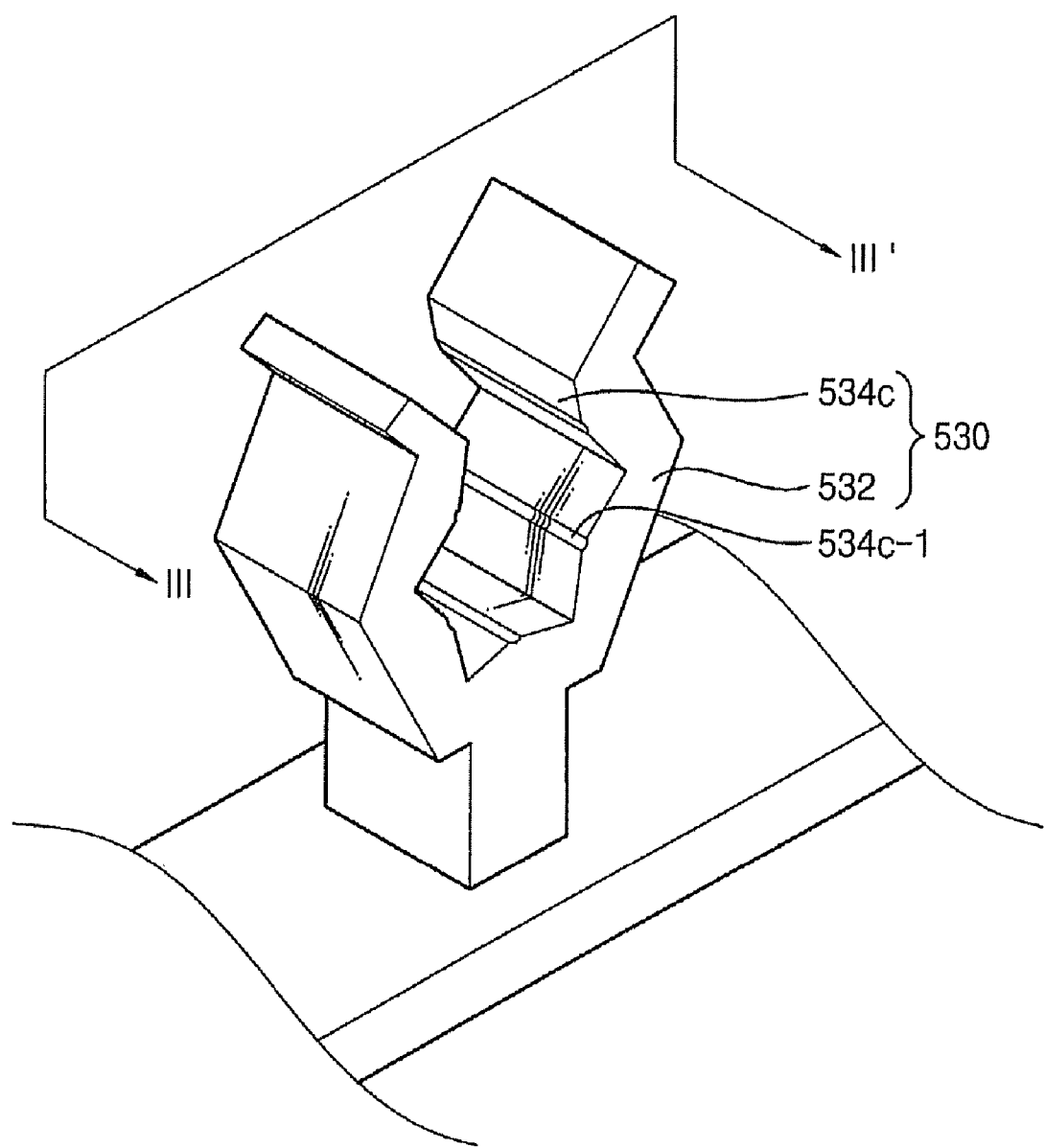
FIG. 6 is a perspective view illustrating a lamp support of a backlight assembly in accordance with another exemplary embodiment of the present invention.
Figure 7:
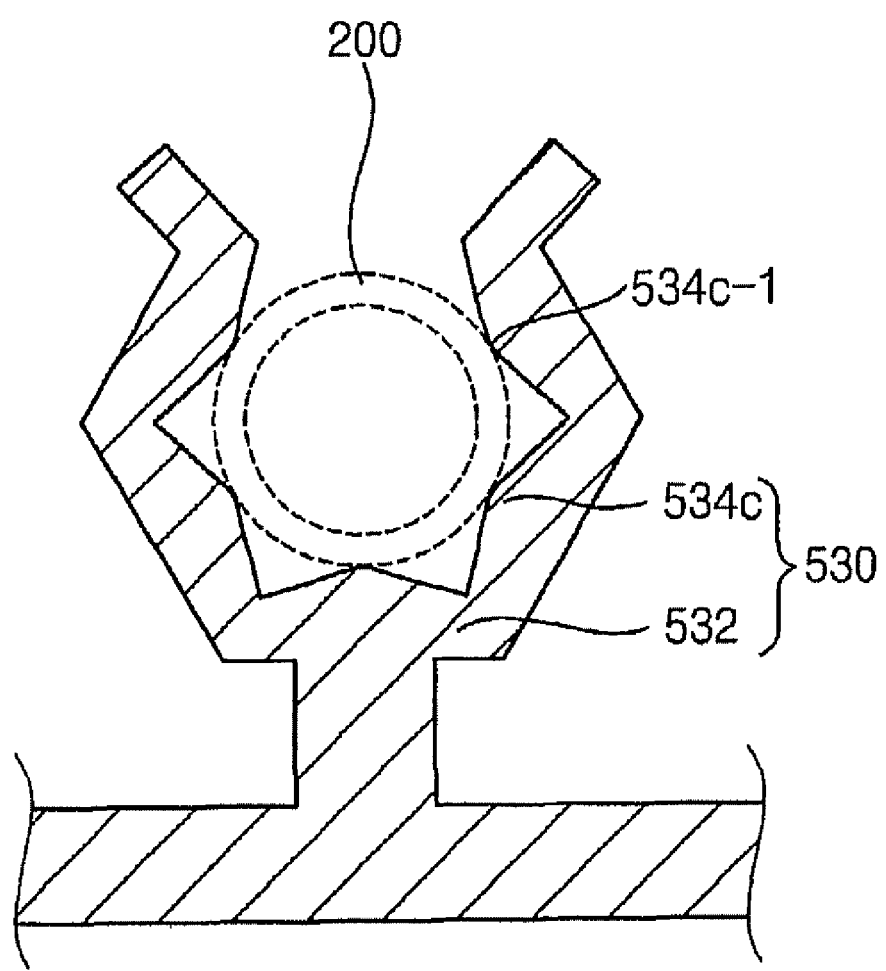
FIG. 7 is a cross-sectional view taken along line III-III' in FIG. 6.

FIG. 6 is a perspective view illustrating a lamp support 530 of a backlight assembly in accordance with yet another exemplary embodiment of the present invention. FIG. 7 is a cross-sectional view taken along line III-III' in FIG. 6.

The backlight assembly of the present exemplary embodiment includes elements substantially the same as those in FIGS. 1-4 except for a lamp support. Thus, the same reference numerals refer to the same elements and any further illustrations with respect to the same elements are omitted herein for brevity.

Referring to FIGS. 6 and 7, the lamp support 530 includes a lamp-fixing portion 532 and a boss 543c making contact with an outer face of each of the respective lamps 200.

The lamp-fixing portion 532 protrudes upwardly from the support body 510. Each of the respective lamps 200 is inserted into a corresponding lamp-fixing portion 532. Thus, the lamp-fixing portion 532 has an opening through which each of the respective lamps 200 is inserted. For example, to readily combine/detach the lamps 200 with/from the lamp-fixing portion 532, the lamp-fixing portion 532 has a U shape having the opening as described above with reference to FIG. 3.

The boss 543c protrudes from an inner face of the lamp-fixing portion 532 extending toward a center of each of the respective lamps 200. The boss 543b may have a shape that makes line contact with the lamps 200. Here, a contact line between the boss 543c and the lamp 200 may be substantially parallel to the lengthwise direction of the lamps 200 extending parallel to each other. For example, the boss 543c has a triangular cross section that extends in the lengthwise direction of the lamp 200. That is, the boss 543c has a prism shape. A plurality of the bosses 543c is arranged along the inner face of the lamp-fixing portion 532. In this exemplary embodiment, the boss 543c has an isosceles triangular cross section. Alternatively, the boss 543c may have an isosceles trapezoidal cross section, a semi-circular shape, etc.

Since the boss 543c has the prism shape, the boss 543c has ends making line contact with the lamp 200. Thus, the boss 543c makes line contact with the lamps 200 so that heat in the lamps 200 is not rapidly transferred to the lamp support 530.

To suppress generation of stresses at the end of the boss 543b, a groove 543c-1 may be formed at the end of the boss 543b. Here, the groove 543c-1 may have a curvature substantially the same as that of each of the lamps 200.

According to the present exemplary embodiment, since the boss 543c having the prism shape makes line contact with the lamp 200 so that the heat in the lamps 200 is not rapidly transferred to the lamp support 530, local dark fields at the lamps 200 may be substantially reduced or effectively eliminated.

Figure 8:
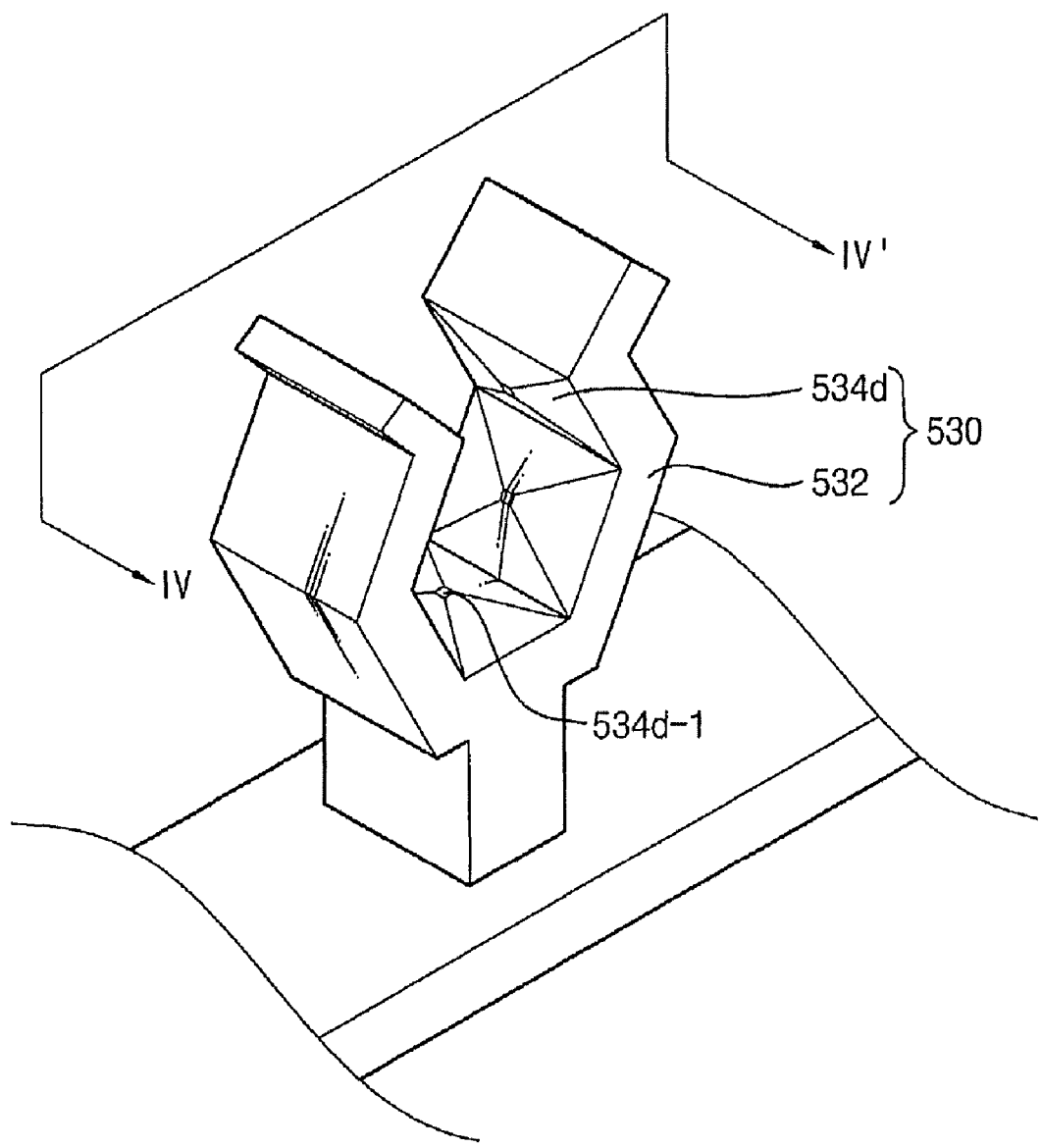
FIG. 8 is a perspective view illustrating a lamp support of a backlight assembly in accordance with yet another exemplary embodiment of the present invention.
Figure 9:
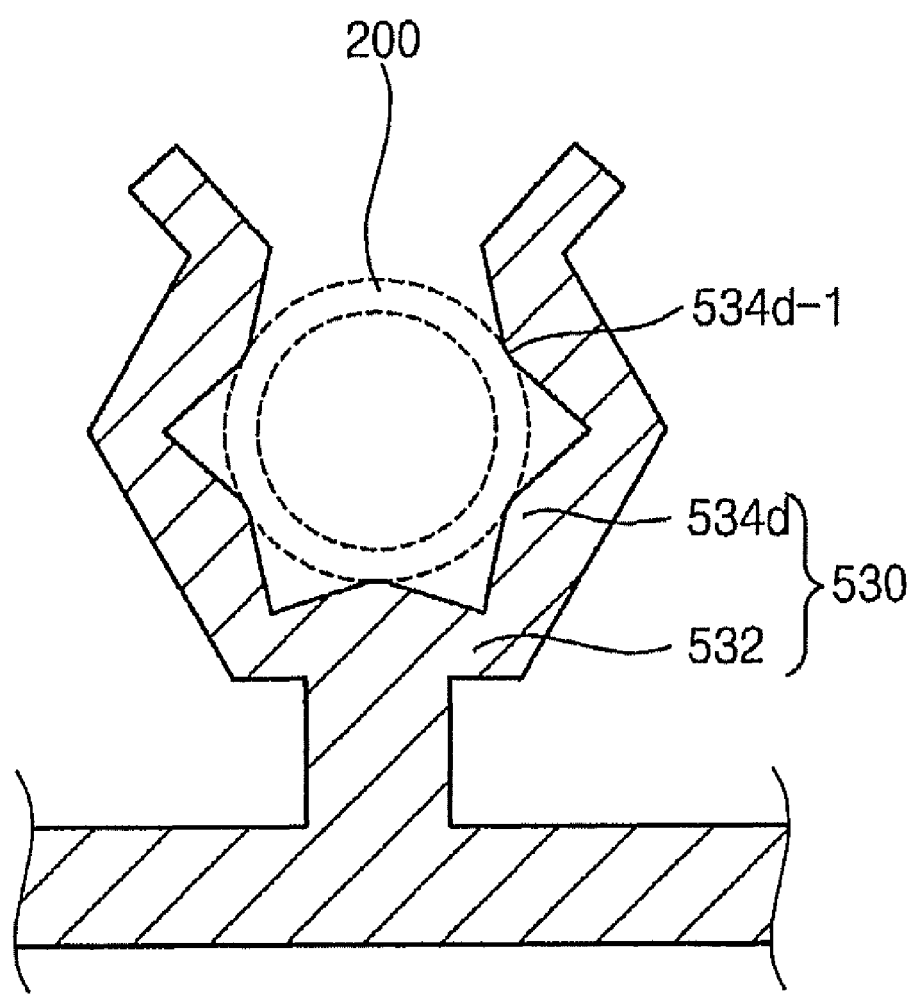
FIG. 9 is a cross-sectional view taken along line IV-IV' in FIG. 8.

FIG. 8 is a perspective view illustrating a lamp support 530 of a backlight assembly in accordance with still another exemplary embodiment of the present invention. FIG. 9 is a cross-sectional view taken along line IV-IV' in FIG. 8.

The backlight assembly of the present exemplary embodiment includes elements substantially the same as those in FIGS. 1-4 except for a lamp support. Thus, the same reference numerals refer to the same elements and any further illustrations with respect to the same elements are omitted herein for brevity.

Referring to FIGS. 8 and 9, the lamp support 530 includes a lamp-fixing portion 532 and a boss 534d making contact with an outer face of each of the lamps 200.

The lamp-fixing portion 532 protrudes upwardly from the support body 510. Each of the lamps 200 is inserted into a respective lamp-fixing portion 532. Thus, the lamp-fixing portion 532 has an opening through which each of the respective lamps 200 is inserted. For example, to readily combine/detach the lamps 200 with/from the lamp-fixing portion 532, the lamp-fixing portion 532 has a U shape having the opening as described above with reference to FIG. 3.

The boss 534d protrudes from an inner face of the lamp-fixing portion 532 extending toward a center of each of the respective lamps 200. A plurality of the bosses 534d is arranged along the inner face of the lamp-fixing portion 532. In this exemplary embodiment, the boss 534d has a pyramidal shape. Alternatively, the boss 534d may have a conical shape, a polygonal conical shape, etc.

Since the boss 534d has a pyramidal shape, the boss 534d has an end making point contact with a respective lamp 200. Thus, the boss 534d makes point contact with the lamp 200 so that heat in the lamp 200 is not rapidly transferred to the respective lamp support 530.

Here, since the boss 534d makes point contact with the lamp 200, stresses may be concentratedly generated at the end of the boss 534d. To suppress the generation of the stresses at the end of the boss 534d, a groove 534d-1 may be formed at the end of the boss 534d. Here, the groove 534d-1 may have a curvature substantially the same as that of each of the lamps 200.

According to the present exemplary ample embodiment, the boss 534d having the pyramidal shape makes point contact with the lamp 200 so that the heat in the lamps 200 is not rapidly transferred to the respective lamp support 530 through a contact portion between the boss 534d and the lamp 200. As a result, local dark fields at the lamps 200 may be substantially reduced or effectively eliminated.

Figure 10:
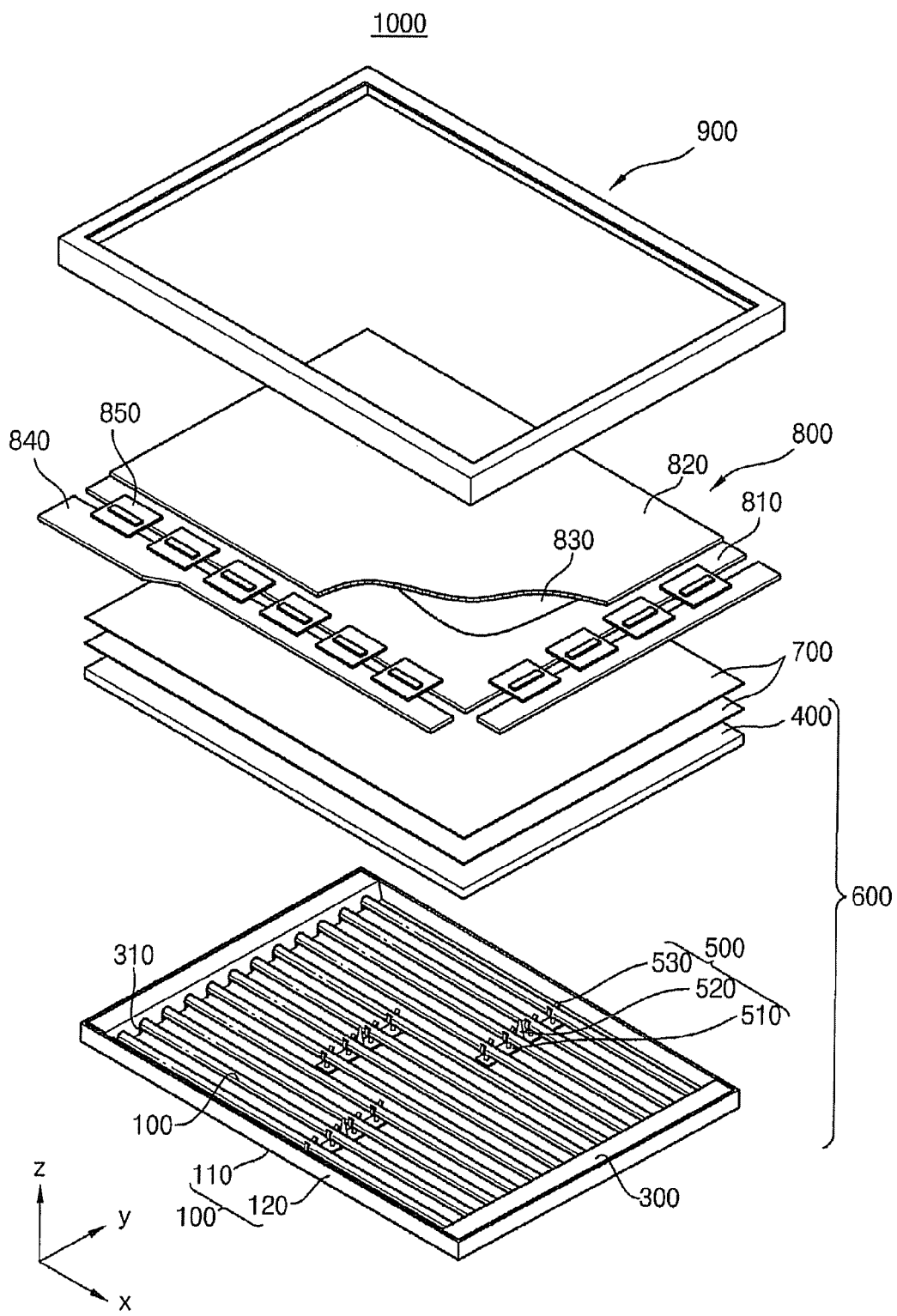
FIG. 10 is an exploded perspective view illustrating a display device in accordance with another exemplary embodiment of the present invention.

FIG. 10 is an exploded perspective view illustrating a display device in accordance with another exemplary embodiment of the present invention.

The display device of the present exemplary embodiment includes the backlight assembly substantially the same as that in FIGS. 1-4. Thus, the same reference numerals refer to same elements in the backlight assembly and any further illustrations with respect to the same elements are omitted herein for brevity.

Referring to FIG. 10, a display device of the present exemplary embodiment includes the backlight assembly 600, an optical sheet 700, a display panel 800 and a top chassis 900.

The optical sheet 700 is arranged over the backlight assembly 600 to improve optical characteristics of light emitted from the backlight assembly 600. The optical sheet 700 may include at least one prism sheet for reflecting and refracting the light to improve vertical luminance of the light.

The display panel 800 is positioned over the optical sheet 700. The display panel converts the light, which is emitted from the backlight assembly 600, passing through the optical sheet 700 into image light including information. The display panel 800 includes a first substrate 810, a second substrate 820, a liquid crystal ("LC") layer 830, a printed circuit board ("PCB") 840 and a flexible circuit board 850.

The first substrate 810 includes a plurality of pixel electrodes arranged in a matrix pattern, thin film transistors ("TFTs") for applying driving voltages to each of the pixel electrodes, and signal lines for driving the TFTs.

The pixel electrode may be formed by patterning a thin film such as an indium tin oxide (ITO) film, an indium zinc oxide (IZO) film, an amorphous indium tin oxide (a-ITO) film, etc., through a photolithography process.

The second substrate 820 faces the first substrate 810. The second substrate 820 includes a conductive transparent common electrode formed on an entire face of the second substrate 820, and color filters arranged facing the pixel electrodes, respectively.

The color filters includes a red color filter for allowing a red light among the white light to pass through the red color filter, a green color filter for allowing a green light among the white light to pass through the green color filter, and a blue color filter for allowing a blue light among the white light to pass through the blue color filter.

The LC layer 830 is interposed between the first and second substrates 810 and 820. The LC layer 830 is rearranged in accordance with an electric field that is generated between the pixel electrode and the common electrode. The rearranged LC layer 830 controls lights transmissivity of the light passing through the optical sheet 700. The light passing through the LC layer 830 then pass through the color filters to display an image.

The PCB 840 includes a driving circuit unit for processing image signals. The driving circuit unit converts the image signals inputted from an exterior into driving signals for controlling the TFTs.

The PCB 840 includes a data PCB and a gate PCB. The data PCB is bent as allowed by the flexible circuit board 850. The bent data PCB is positioned at a side face or a rear face of the container 100. The gate PCB is bent as allowed by another flexible circuit board 850. The bent gate PCB is positioned at a side face or a rear face of the container 100. Alternatively, when additional signal lines are formed on the first substrate 810 and the flexible circuit board 850, the gate PCB may be omitted.

The flexible circuit board 850 is electrically connected between the PCB 840 and the first substrate 810. The flexible circuit board 850 transmits the driving signals generated from the PCB 840 to the first substrate 810. The flexible circuit board 850 may include a tape carrier package ("TCP"), a chip-on-film ("COF"), etc.

The top chassis 900 covers edges of the display panel 800. The top chassis 900 is combined with the side faces 120 of the container 100 to fix the display panel 800 to an upper face of the backlight assembly 600. The top chassis 900 serves as to prevent the display panel 800 having weak brittleness from being broken or damaged and from being detached from the container 100 due to external impacts and vibrations.

According to the present invention, the boss protruding from the lamp-fixing portion makes point or line contact with the respective lamp so that the heat in the lamps is not rapidly transmitted to the lamp support through the contact portion between the lamp support and the lamp. Thus, since the contact area between the lamp support and the lamps is remarkably reduced, the local dark fields at the lamp may be substantially reduced or effectively eliminated because a local decrease in temperature of the lamp covered by the lamp-fixing portion may be prevented. As a result, the display device may have improved image display quality. In other words, the point or line contact eliminates a local decrease in temperature of the lamp covered by the lamp-fixing portion and thus improves image display quality by preventing or eliminating dark spots caused by the heat sink capability of the lamp-fixing portion.

Further, the groove may be formed at the end of the boss so that the stresses, which are generated in line contact or point contact between the boss and the lamp, may be suppressed. As a result, the damage to the lamp caused by the stresses may be prevented.

Having described the exemplary embodiments of the present invention and its advantages, it is noted that various changes, modifications, substitutions and alterations can be made herein by one of ordinary skill in the art without departing from the spirit and scope of the present invention as defined by the appended claims.

What is claimed is:

1. A backlight assembly comprising:
 a container including a bottom face and side faces extending therefrom defining a receiving space;
 a plurality of lamps arranged in parallel in the container; and
 a lamp-fixing member including a support body arranged in the container along a direction intersecting a direction of extension of the lamps arranged in parallel, a lamp-fixing portion protruding from the support body to cover a respective lamp, and a plurality of bosses protruding from an inner face of the lamp-fixing portion to fix the respective lamp with a corresponding lamp-fixing portion, the plurality of bosses being substantially rigid, the boss and the lamp-fixing portion being integrally formed with the support body as an indivisible unitary part,
 wherein each boss has a pyramidal shape, is entirely spaced apart from any other adjacent boss, has a symmetrical cross section, an end of the pyramidal boss includes a groove having a curvature substantially matching that of the lamp and each lamp makes contact with only the plurality of bosses protruding from the inner face of the corresponding lamp-fixing portion.

2. A backlight assembly comprising:
 a container including a bottom face and side faces extending therefrom defining a receiving space;

a plurality of lamps arranged in parallel in the container; and a lamp-fixing member having a U-shape with ends bent toward an outside of the U-shape, wherein the ends have substantially a same thickness as a remaining portion of the lamp-fixing member, and including a support body arranged in the container along a direction intersecting a direction of extension of the lamps arranged in parallel, a lamp-fixing portion protruding from the support body to cover a respective lamp, and a plurality of bosses protruding from an inner face of the lamp-fixing portion to fix the respective lamp with a corresponding lamp-fixing portion, the plurality of bosses being substantially rigid, the boss and the lamp-fixing portion being integrally formed with the support body as an indivisible unitary part, wherein each boss is entirely spaced apart from any other adjacent boss and has a symmetrical cross section and each lamp makes contact with only the plurality of bosses protruding from the inner face of the corresponding lamp-fixing portion.

3. The backlight assembly of claim 2, wherein each boss makes point contact with an outer face of the respective lamp.

4. The backlight assembly of claim 3, wherein each boss has a rounded end making point contact with the outer face of the respective lamp.

5. The backlight assembly of claim 4, wherein the plurality of bosses are arranged in one of a linear and a zigzag pattern relative to a centerline along the inner face of the lamp-fixing portion.

6. The backlight assembly of claim 3, wherein each boss has a pyramidal shape.

7. The backlight assembly of claim 2, wherein each boss makes line contact with an outer face of the respective lamp.

8. The backlight assembly of claim 7, wherein a contact line between each boss and the lamp extends substantially in a lengthwise direction of each of the lamps.

9. The backlight assembly of claim 8, wherein each boss has a triangular cross section extending in the lengthwise direction of the respective lamp.

10. The backlight assembly of claim 2, wherein a groove is formed at an end of each boss that makes contact with the respective lamp.

11. The backlight assembly of claim 2, wherein the lamp-fixing portion has an opening into which the respective lamp is inserted.

12. The backlight assembly of claim 2, further comprising a diffusion plate positioned over the lamps to diffuse light emitted from the lamps.

13. The backlight assembly of claim 12, wherein the lamp-fixing member further comprises a diffusion plate support protruding upwardly from the support body to support the diffusion plate.

14. The backlight assembly of claim 2, wherein the lamp-fixing member further comprises a protrusion formed on a bottom face of the support body and combined with the bottom face of the container.

15. The backlight assembly of claim 14, wherein a hole into which the protrusion is inserted is formed through the bottom face of the container.

16. A display panel comprising:

a backlight assembly including a container that has a bottom face and side faces extending therefrom, a plurality of lamps arranged in parallel on the bottom face of the container, and a lamp-fixing member combined with the bottom face of the container to fix the lamps; and a display panel positioned over the backlight assembly to display an image using light emitted from the backlight assembly, wherein the lamp-fixing member has a U-shape with ends bent toward an outside of the U-shape wherein the ends have substantially a same thickness as a remaining portion of the lamp-fixing member, and comprises a support body arranged in the container along a direction intersecting a direction of extension of the lamps arranged in parallel, a lamp-fixing portion protruding from the support body to cover a respective lamp, and a plurality of bosses protruding from an inner face of the lamp-fixing portion to fix the respective lamp with a corresponding lamp-fixing portion, the plurality of bosses being substantially rigid, the boss and the lamp-fixing portion being integrally formed with the support body as an indivisible unitary part, wherein each boss is entirely spaced apart from any other adjacent boss and has a symmetrical cross section and each lamp makes contact with only the plurality of bosses protruding from the inner face of the corresponding lamp-fixing portion.

17. The display panel of claim 16, wherein each boss makes point contact with an outer face of the respective lamp.

18. The display panel of claim 16, wherein each boss makes line contact with an outer face of the respective lamp.

19. The display panel of claim 16, wherein the backlight assembly further comprises a diffusion plate positioned over the lamps, and the lamp-fixing member further comprises a diffusion plate support upwardly protruded from the support body to support the diffusion plate.

20. The display panel of claim 16, wherein the lamp-fixing member further comprises a protrusion formed on a bottom face of the support body and combined with the bottom face of the container.

21. The display panel of claim 16, wherein each boss makes one of point contact and line contact with the respective lamp and the plurality of bosses are arranged in one of a linear and a zigzag pattern relative to a centerline along the inner face of the lamp-fixing portion.

* * * * *